United States Patent
Ortega

[11] 3,867,289
[45] Feb. 18, 1975

[54] CHECK VALVE AND CHECK INDICATOR

[76] Inventor: Robert Ortega, 18194 Aztec Ct., Fountain Valley, Calif. 92708

[22] Filed: Nov. 8, 1973

[21] Appl. No.: 413,938

[52] U.S. Cl. ............... 210/95, 137/514.5, 210/136, 210/169
[51] Int. Cl. ........................................... B01d 35/14
[58] Field of Search ............... 210/136, 169, 44, 95; 137/514.7, 514.5

[56] References Cited
UNITED STATES PATENTS

| | | | |
|---|---|---|---|
| 1,322,938 | 11/1919 | Parker | 137/514.7 |
| 3,220,553 | 11/1965 | Growall et al. | 210/136 X |
| 3,312,345 | 4/1967 | Rosaen | 210/95 X |
| 3,425,444 | 2/1969 | Jones | 137/514.5 X |
| 3,513,977 | 5/1970 | Bellinson | 210/94 |
| 3,756,220 | 9/1973 | Tehrani et al. | 210/169 X |

*Primary Examiner*—Frank A. Spear, Jr.
*Attorney, Agent, or Firm*—George F. Smyth

[57] ABSTRACT

A check valve having a valve body with an inlet and a discharge with the valve body constructed for positioning of the inlet in a generally vertical position and the discharge in a generally horizontal position. A passage is provided within the valve body with the passage being positioned in substantial alignment with the inlet. A valve member is positioned within the passage for substantially vertical movement with respect to the inlet in the valve body. The valve member forms a seal about the inlet when the valve member is in a lowered position. However, when liquid is forcefully withdrawn from the valve body through the discharge, the valve member undergoes upward movement within the passage to open the inlet and to permit flow of liquid through the valve.

Damping means may be associated with the valve to damp the movement of the valve member within the passage. Also, the check valve may include a removable closure member which is positioned at an end of the slide passage such that the valve member may be withdrawn from the passage on removal of the closure member. Additionally, the check valve may include means to indicate the position of the valve member within the passage so that the flow rate of liquid through the valve body may be determined from the position of the valve member.

7 Claims, 4 Drawing Figures

PATENTED FEB 18 1975 3,867,289

CHECK VALVE AND CHECK INDICATOR

The present invention pertains to a check valve in which a valve body having an inlet and a discharge is constructed for positioning the inlet in a generally vertical position and the discharge in a generally horizontal position. A passage is provided within the body with the passage being positioned in general alignment with the inlet. A valve member is positioned within the passage for generally vertical movement with respect to the inlet. With the valve member in a lowered position, the member forms a seal about the inlet. However, when liquid is forcefully withdrawn from the valve body through the discharge, the valve member undergoes upward movement within the passage to open the inlet.

The present check valve may include damping means to damp the movement of the valve member within the valve passage. Thus, the inlet member may undergo relatively gradual movement within the passage in response to abrupt changes in the withdrawal rate of liquid through the discharge from the valve body.

The valve member may include a central portion having enlarged upper and lower end members positioned at either end of the central portion. The end members may have a larger lateral dimension than the central portion of the valve member with at least one of the end members having an exterior surface which is contoured to the contour of the passage. Additionally, a gap may be provided between the exterior surface and the passage which is sufficiently large to permit flow of liquid through the gap. Then, during movement of the valve member within the passage, the movement of the valve member is damped by the flow of liquid through the gap between the exterior surface and the interior wall of the passage.

Preferably, the upper and lower end members have a cylindrical exterior surface with the passage having a cylindrical inner surface. In this instance, the gap between at least one of the end members and the passage has an annular configuration.

Additionally, the present check valve may include a removable closure member positioned at an end of the passage. This permits easy removal of the valve member from the passage by removal of the closure member. Thus, the valve may be serviced without having to disconnect the valve body from adjacent pipes to which the valve body may be joined.

The present check valve may also include means to indicate the position of the valve member within the passage. Since the flow rate of liquid through the valve body is related to the position of the valve member within the passage, this permits a determination of the flow rate of liquid through the valve body.

The means to indicate the position of the valve member within the slide passage may include a sight glass opening in the valve body with a sight glass covering the opening to permit visual observation of the valve member. Indicia may be provided on the sight glass with the position of the indicia corresponding to the position of the valve member at various flow rates through the valve body. In this manner, the flow rate of liquid through the valve body may be determined by observing the position of the valve member with respect to the indicia on the sight glass.

In addition to providing a check valve, the present invention also concerns a swimming pool system. The swimming pool system includes a swimming pool having a pool inlet and a pool outlet, and a pump having a pump inlet and a pump outlet, with the pump outlet positioned above the pump inlet. The pump inlet is in flow communication with the pool outlet and a filter is positioned between the pump outlet and pool inlet. Water which is discharged from the pump, thus, passes through the filter before reaching the pool inlet.

A check valve is positioned between the pool outlet and pump inlet. The check valve permits the flow of water from the pool outlet to the pump inlet when the pump is operating and prevents back flow of water through the pump to the pool outlet when the pump is not operating. This prevents the back flow of water which may contain diatomaceous earth from the filter into the pool water when the pump is not operating.

The check valve of the swimming pool system includes a valve member whose position is determined by the flow rate of water through the check valve and also means to determine the position of the valve member. By observing the position of the valve member, the flow rate of water through the check valve may be determined. Since the flow rate through the check valve is inversely proportional to the resistance of the swimming pool system to liquid flow, the position of the valve member may be used as a basis for observing the presence or absence of obstructions in the swimming pool system which increase the resistance of the system to the flow of water.

To further illustrate an embodiment of the invention, reference is made to the accompanying drawing in which.

Figure 1:
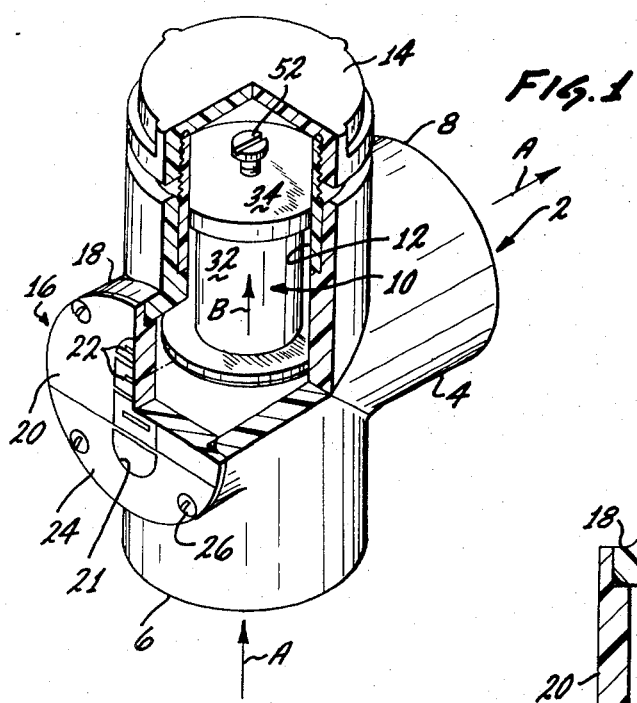
FIG. 1 is a partially sectioned pictorial view of a check valve and flow indicator in which a valve member undergoes generally vertical movement within a passage in response to the rate of liquid flow through the check valve.
Figure 3:
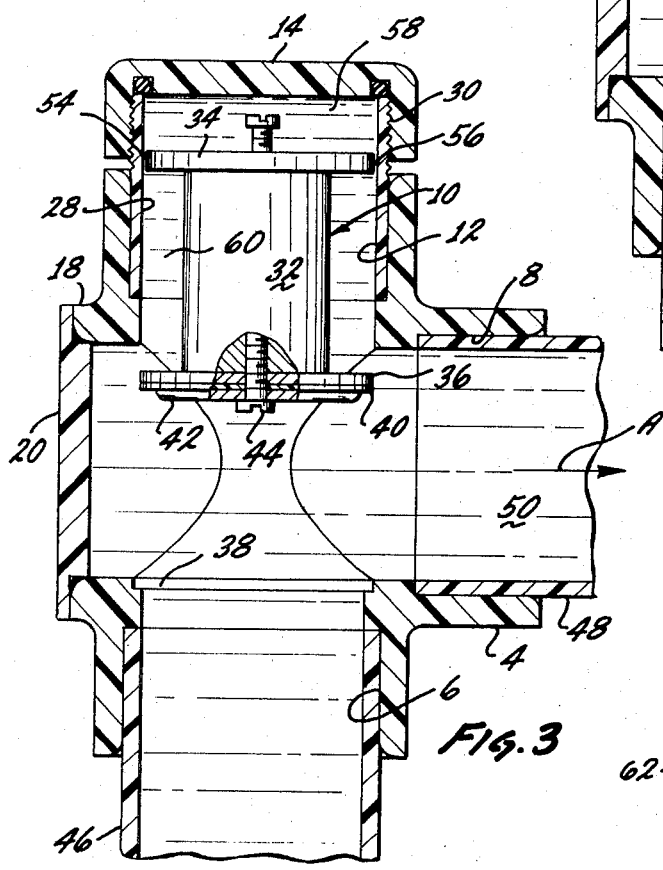
Figure 4:
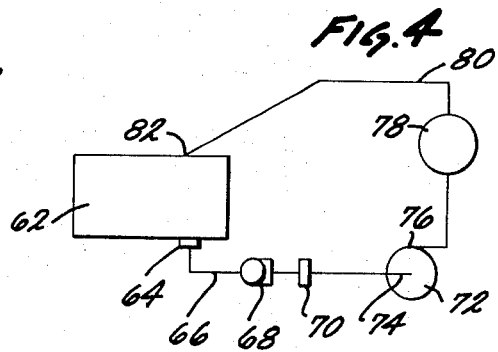

FIG. 3 is a front sectional view through the check valve of FIG. 1 with the valve member in a raised position to permit liquid flow through the valve, and FIG. 4 is a schematic representation of a swimming pool system in which a check valve and flow indicator is placed in the outlet line between the swimming pool outlet and the pump inlet to prevent the back flow of liquid when the pump is not operating and to monitor the operation of the system by observing the flow rate of water through the check valve.

Turning to FIG. 1, a check valve 2 includes a valve body 4 having an inlet 6 and a discharge 8. The valve body 4 is constructed for positioning of the inlet 6 in a generally vertical direction and the discharge 8 in a generally horizontal direction. When thus positioned, the direction of water flow is indicated by the arrows A with the water entering through inlet 6 and being ejected from the valve body 4 through the discharge 8.

A valve member, generally indicated as 10, is positioned within a passage 12 with the passage positioned in general alignment with the inlet 6. When water passes through the valve body 4, the valve member 10 undergoes upward movement in the direction of the arrow B. However, when liquid flow through the valve body 4 ceases, the valve member 10 undergoes movement in a direction opposite to that indicated by arrow B to close the valve 2.

A removable closure 14 is positioned at an end of the passage 12. On removal of the closure 14, the valve member 10 may then be withdrawn from the passage 12. This permits easy maintenance of the check valve 2 without having to disconnect the check valve from adjoining piping to which it may be connected.

During flow of liquid through the valve body 4 in the direction of the arrows A, the flow rate of liquid through the valve body is proportional to the position of the valve member 10 within the passage 12. Thus, the check valve 2 may include means 16 to determine the position of the valve member 10 within the passage 12. This permits a determination of the flow rate of liquid through the valve 2 from the position of the valve member 10.

The means 16 may include a side boss 18 on the valve body 4 which provides an opening that is covered by a sight glass closure 20. The sight glass closure 20 may include a transparent area 21 having indicia 22 positioned thereon. The position of the indicia 22 indicate varying flow rates through the valve body 4 in terms of the position of the valve member 10. Thus, by observing the location of valve member 10 with respect to the indicia 22, the flow rate of liquid through the valve body 4 may be directly determined.

If there is an obstruction in the system, this will produce increased resistance to liquid flow which will be reflected in a lower flow rate through the valve body 4. Thus, the lower portion of the sight glass closure 20 may be colored in the area denoted 24. When the valve member 10 is positioned within area 24 with liquid flowing through the valve body 4, this may provide an indication that the system is not functioning properly and should be repaired by removing the obstruction which is interfering with the flow rate of liquid through the system. The sight glass closure 20 may be affixed to the side boss 18 in any suitable manner. Thus, for example, screws 26 may be employed which pass through apertures in the sight glass closure 20 to engage threaded openings in the boss 18.

Figure 2:
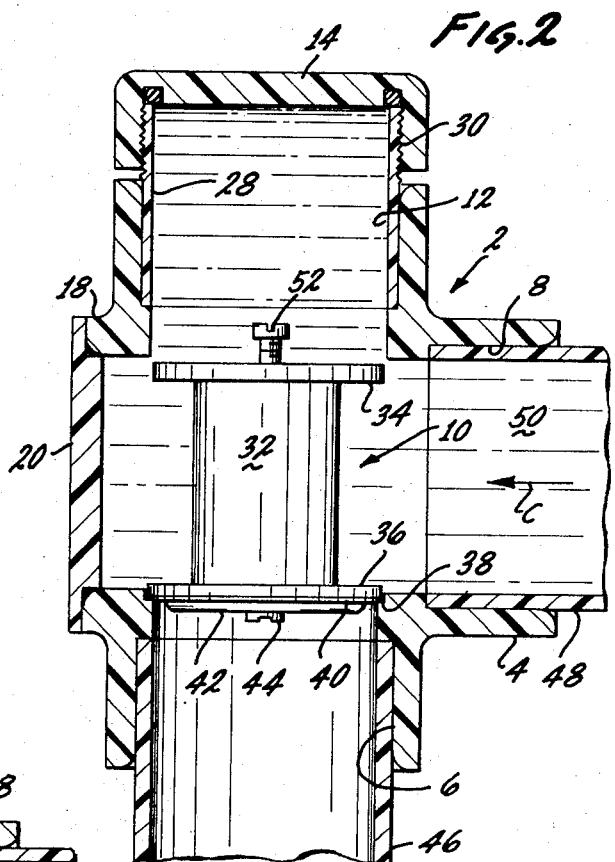
FIG. 2 is a front sectional view of the check valve of FIG. 1 with the valve member in a lowered position to prevent back flow through the valve.

Turning to FIG. 2, which is a front sectional view through the check valve of FIG. 1, the passage 12 may include a sleeve 28 which is positioned within an opening in the valve body 4. The sleeve 28 may include a threaded portion 30 which threadedly engages corresponding threads on the closure 14.

The valve member 10 may also include a central portion 32 having an upper end enlargement 34 and a lower end enlargement 36. The end enlargements 34 and 36 may each have a lateral dimension which exceeds a lateral dimension of the central portion 32. A valve seat 38 formed adjacent the inlet 6 engages the lower end enlargement 36 when the valve member 10 is in a lowered position as indicated in FIG. 2. The lower end enlargement 36 may include a seating member 40, conveniently formed of a soft plastic material, which is retained against the lower surface of enlargement 36 by an end member 42. A screw 44, or any suitable connecting means, may secure the end member 42 and seating member 40 to the undersurface of the enlargement 36 with the screw passing through aligned apertures in the end member and seating member and engaging a threaded opening in the enlargement.

With the valve member 10 in a lowered position, as shown in FIG. 2, back flow of liquid in the direction of the arrow C is prevented. The valve body 4 may be connected to pipes, as indicated by the pipes 46 and 48.

With the valve member 10 in a lowered position, the interior of the valve body 4 contains liquid, as indicated by reference numeral 50. Additionally, as shown in FIG. 2, a screw 52 may extend from the upper surface of the end enlargement 34 with the screw being utilized for withdrawing valve member 10 from passage 12. Also, the screw 52 may serve as a stop in limiting the upward movement of valve member 10 within passage 12.

FIG. 3, which is a front sectional view similar to FIG. 2, illustrates the upward movement of valve member 10 in response to the forcible withdrawal of liquid through the discharge 8. As shown in FIG. 2, the interior of the valve body 4 contains liquid 50 when the valve member 10 is in its lowered position. When the liquid 50 is then forcibly withdrawn from the discharge 8, this creates a region of low pressure above the lower end enlargement 36 which causes upward movement of valve member within the passage. On upward movement of the valve member 10 to a position as shown in FIG. 3, liquid flows through the valve body 4 from inlet 6 to discharge 8. The flow of liquid through the valve body 4 is indicated by arrow A which has the same notation as the arrows A in FIG. 1.

The end enlargements 34 and 36 on valve member 10 form exterior surfaces 54. As indicated, the exterior surface 54 of upper end enlargement 34 is closely positioned to the interior surface of the passage 12 to form a gap 56 between the exterior surface and the passage. The gap 56 is sufficiently large to permit passage of liquid through the gap. Thus, on upward movement of valve member 10 from its position shown in FIG. 2, liquid flows from a region 58 above end enlargement 34, through the gap 56 and into a region 60 below the end enlargement. Conversely, on downward movement of the valve member 10, liquid will flow from region 60, through the gap 56 and into the region 58. The gap 56 provides resistance to liquid flow which damps the movement of the valve member 10 in response to sudden changes in the withdrawal rate of liquid through discharge 8. The net effect is to damp the movement of the valve member 10 such that it moves gradually within passage 12 in response to abrupt changes in the rate of liquid flow through valve body 4.

In observing the position of valve member 10 within passage 12, the lower end enlargement 36 may be viewed through the sight glass closure 20 to determine the position of the valve member. Conveniently, the seating member 40 may have a different color than the balance of the valve member 10 or the interior of valve body 4. Thus, for example, the seating member 40 may be colored white so as to be more easily observed through sight glass closure 20 in determining the position of valve member 10.

In usage, a valve such as the check valve 2 illustrated in FIGS. 1-3 may be used in a swimming pool system as schematically illustrated in FIG. 4. The swimming pool system includes a swimming pool 62 which generally includes a skimmer 64 over which water passes in being withdrawn from the pool through a pool outlet line 66. Various forms of skimmers 64 are known, such as, for example, a weir construction over which the uppermost layer of pool water is withdrawn. Dirt and other debris may then be removed from the pool water by being entrained by the skimmer 64.

In the swimming pool system of the invention, the outlet line 66 leads to a check valve and flow indicator 68 which may be of the type generally indicated as 2 in FIGS. 1-3. The check valve and flow indicator 68 may include a valve member, such as valve member 10, whose position varies in relation to the flow rate of water through the check valve and flow indicator. The discharge from the check valve and flow indicator 68, such as discharge 8, may lead to a lint catcher 70 positioned between the check valve and flow indicator and a pump 72 having a pump inlet 74. The pump 72 includes a pump outlet 76 which is positioned above the pump inlet 74. Thus, when pump 72 is not in operation, there is a liquid head of water acting through the pump upon the closed check valve and flow indicator 68. This maintains water in the check valve and flow indicator 68 when the pump 72 is not operating. Proceeding from the pump outlet 76, the flow path of water leads to a filter 78 positioned in an inlet line 80 to the pool inlet 82.

During operation of the pool system illustrated in FIG. 4, the skimmer 64 or lint catcher 70 may become clogged with debris. Also, during usage, the filter 78 will become clogged after a period of time. When any of these events occur, the flow rate of liquid through the system will be reduced.

Previously, pressure indicators have been placed on a filter such as the swimming pool filter 78. However, the use of a pressure indicator on the filter is not an effective means of monitoring the overall system. Thus, for example, a pressure gauge placed on filter 78 only senses the pressure on the discharge side of the pump 72 with increased pressure indicating an obstruction on the discharge side. However, for example, if the overall system malfunctions because of a stopped-up lint filter 70 or clogged skimmer 64, this would not cause a pressure increase at the filter 78 and the user would, thus, not be aware of the presence of an obstruction in the system.

By placing a flow indicator, such as the indicator 68, in the inlet line to the pump 72, the entire swimming pool system may be monitored. Thus, anything which causes an increased resistance to liquid flow, whether on the inlet or discharge side of pump 72, will show up in the form of a reduced flow rate through the check valve and flow indicator 68. Thus, by placing the flow indicator on the inlet side of the pump 72, the entire system is monitored both on the inlet side and discharge side of the pump.

When a pump, such as the pump 72, is shut down, back flow of water may occur through the pump. The water which back flows through the pump 72 will generally contain diatomaceous earth from the filter 78. The presence of the diatomaceous earth will cause a discoloration of the water which can be undesirable if the back flowed water is permitted to reach the swimming pool 62.

In the present swimming pool system, the back flow of water through pump 72 is prevented by the check valve 68 which only permits water flow to the inlet 74 of pump 72. Thus, when the pump 72 is not operating, the back flow of dirty water into the swimming pool 62 is prevented.

The valve body 4, as described previously, may be formed of either metal or a plastic. The valve member 10 is constructed of a heavy material, such as brass, so that its weight will provide downward movement of valve member 10 within passage 12 when liquid is not being withdrawn from discharge 8.

I claim:
1. In a swimming pool system, the combination comprising:
a swimming pool having a pool inlet and a pool outlet;
a pump having a pump inlet and a pump outlet;
said pump outlet positioned above said pump inlet and said pump inlet in flow communication with said pool outlet;
a filter;
said filter positioned between said pump outlet and said pool inlet such that water discharged from the pump passes through the filter before reaching the pool inlet;
a check valve positioned between the pool outlet and the pump inlet;
said check valve permitting the flow of water from the pool outlet to the pump inlet when the pump is operating and said valve preventing the back flow of water through the pump to the pool outlet when the pump is not operating;
said check valve including a valve member with the position of the valve member determined by the flow rate of water through said check valve, and
means to determine the position of said valve member when the pump is operating,
whereby the flow rate of water through the check valve and the position of the valve member indicate the presence of obstructions in the swimming pool system.
2. The swimming pool system of claim 1 including a skimmer positioned at said swimming pool outlet.
3. The swimming pool system of claim 1 including a valve inlet and a valve discharge in said check valve, and
a lint catcher positioned between said valve discharge and said pump inlet.
4. A check valve comprising:
a valve body having an inlet and a discharge;
said body constructed for positioning of said inlet in a generally downwardly directed position and said discharge in a generally horizontally directed position;
a passage within said body;
said passage positioned in a generally vertical position in alignment with said inlet;
a valve member positioned within said passage for generally vertical movement with respect to said inlet;
said valve member having a lower end which forms a seal about said inlet with the valve member in a lowered position;
damping means associated with said valve to damp the movement of said valve member within said passage;
said valve member has a central portion and enlarged end members positioned at each end of said central portion;
said end members having a larger lateral dimension than said central portion and an exterior surface which is contoured to the contour of said passage;
said end members being smaller than said passage to provide a gap between said exterior surface and said passage which is sufficiently large to permit the flow of liquid through said gap;
said end members each having a cylindrical exterior surface with said passage having a cylindrical inner surface and said gap having an annular configuration;

a removable closure positioned at an end of said passage;

a sight glass opening in said body;

a sight glass covering said opening to permit visual observation of the position of said valve member;

indicia associated with said sight glass with the position of said indicia corresponding to the position of the valve member at various flow rates through the valve body, and said indicia positioned in a substantially horizontal direction with said inlet positioned in a downwardly directed position and said discharge in a generally horizontal position.

5. The check valve of claim 4 including a lower region of said sight glass having a shape and a position that corresponds to the position of said valve member when flow through said valve is diminished, whereby the visual observation of said valve member within said region indicates the presence of an obstruction to liquid flow in the system including said check valve.

6. The check valve of claim 5 wherein said lower region has a color which differs from the color of the remainder of said sight glass.

7. The check valve of claim 6 including a seating member positioned at said lower end of said valve member;

said seating member having a shape which conforms to and engages said inlet with said valve member in a lowered position to form a fluid tight seal between said valve member and said inlet, and said seating member having a color which differs from the color of the balance of said valve member and from the interior of said valve body, whereby the position of said valve member within said valve body is clearly indicated by the position of said colored seating member as observed through said sight glass.

* * * * *